Jan. 29, 1957 M. FEBBRARO 2,779,472
CONTAINER HAVING SEDIMENT TRAPS
Filed April 6, 1953 3 Sheets-Sheet 1
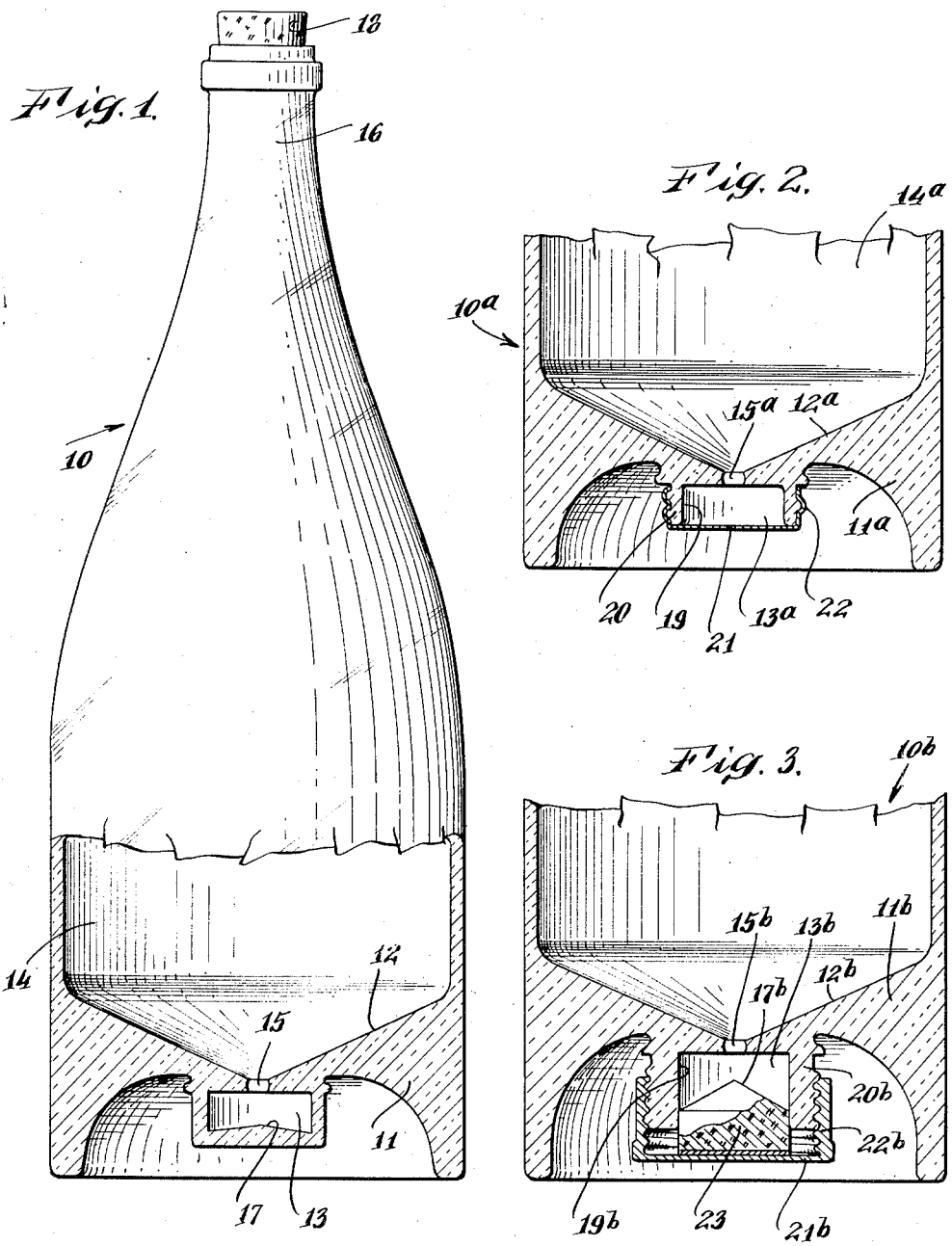
INVENTOR.
MARIO FEBBRARO
BY Haseltine, Lake & Co.
AGENTS.

Jan. 29, 1957  M. FEBBRARO  2,779,472
CONTAINER HAVING SEDIMENT TRAPS
Filed April 6, 1953  3 Sheets-Sheet 2
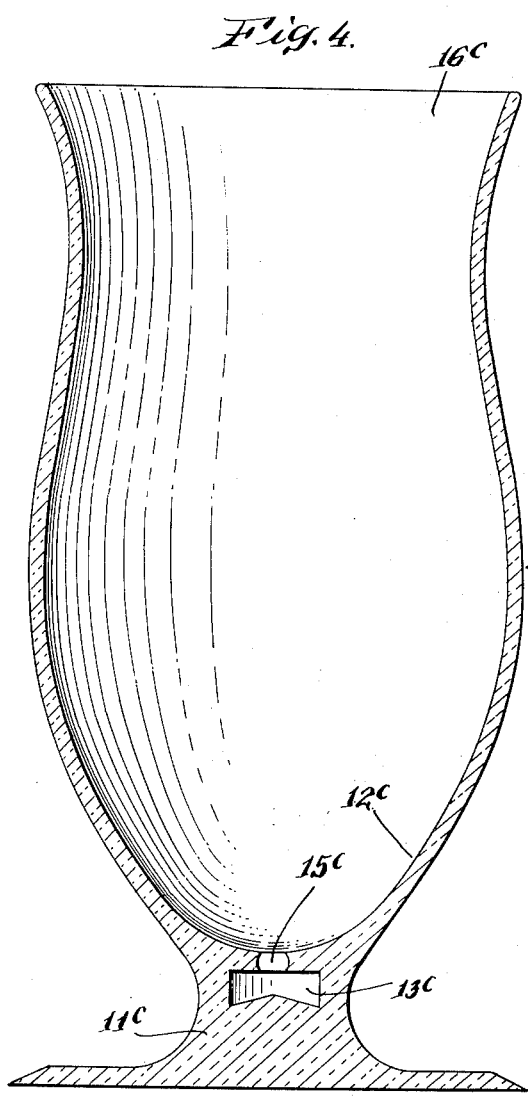
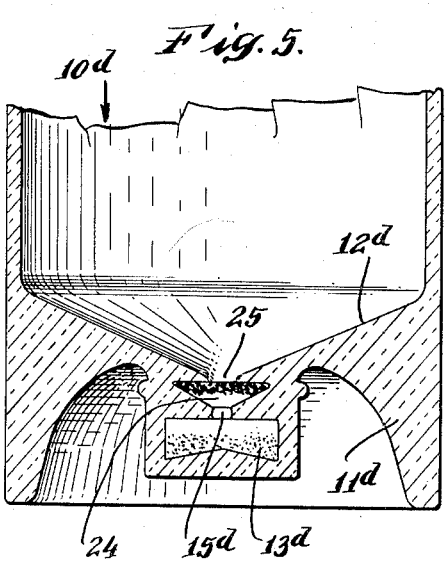
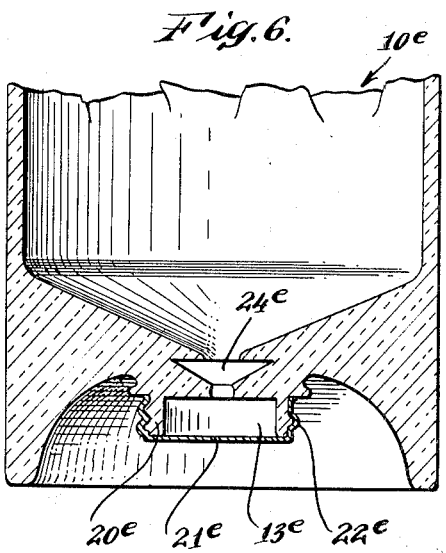
INVENTOR.
MARIO FEBBRARO
BY Haseltine, Lake & Co.
AGENTS.

United States Patent Office 2,779,472
Patented Jan. 29, 1957

---

2,779,472

CONTAINER HAVING SEDIMENT TRAPS

Mario Febbraro, Union City, N. J.

Application April 6, 1953, Serial No. 347,015

7 Claims. (Cl. 210—57)

The present invention relates to the entrapment and removal of sediment from liquids, and is particularly directed to containers having sediment traps for collecting and retaining the sediment forming in a liquid so that, when the liquid is removed from the container, the liquid is in a clarified condition.

While containers having sediment traps in accordance with the present invention are particularly useful for holding aging and aged spiritous liquors and sparkling wines and the like, such containers may also be advantageously employed for any other liquids having a sediment, or in which a sediment forms, and wherein it is desirable to separate the sediment from the liquid prior to use of the latter.

It is well known that, in preparing sparkling alcoholic beverages or wines, aging is required, but during the aging process sediment forms. In order to separate such sediment from the liquid constituents of the wine, it has been the customary practice to store the bottle in a horizontal position and turn it frequently while gradually elevating the bottle toward a vertical, inverted position. These manipulations are intended to cause the sediment to accumulate and adhere on the inside face of the cork or stopper. However, this procedure is time cosuming and requires great skill, and after the aging is completed extreme care must be exercised in handling the bottle and in removing the cork to ensure that none of the accumulated sediment falls off the cork back into the liquid contents.

Further, at the present time wines and other spirits are often shipped over long distances from the location at which they are bottled to the points of consumption, and during such shipment the bottled wines are subjected to large temperature variations which cause turbidity and the formation of a precipitate or sediment deposit. Such sediment in wine is objectionable and its removal has heretofore required the reopening of the cases and bottles and the refiltering and reworking of the wine causing loss of aroma and strength as well as the additional cost of labels, rebottling and new Federal tax stamps. In order to deter the formation of the sediment in wines, some wines have been pasteurized to prevent further fermentation after bottling, but this practice causes the wine to be "flat" or "lifeless."

Accordingly, it is an object of the present invention to provide containers for wines and other liquids in which sediments are formed, wherein the container is provided with means for collecting and retaining the sediment so that the clarified liquid can be poured in the usual way from the container and will not be contaminated by the collected sediment.

Another object is to provide a container with means for entrapping the sediment settling out of the liquid in the container and which can be manufactured simply and inexpensively to economically permit the discarding of the container after use.

A further object is to provide containers of the described character which automatically effect separation of the sediment from wine and other similar liquids when the wine is poured in the usual manner, and wherein the separation of the sediment from the clarified wine can be achieved without the exercise of particular care or exceptional skill.

Still another object is to provide containers of the described character wherein the sediment collecting traps can be removed from the containers and cleaned to permit re-use of the containers.

A still further object is to provide a container of the described character with a sediment collecting trap of variable capacity so that the capacity of the trap may be maintained at the minimum necessary for accommodating the deposited sediment in the wine thereby reducing the volume of the non-usable portion of the wine contained in the trap along with the collected sediment.

It is a further object of the invention to provide a container for sparkling wines having a gelatinous substance therein to promote clarification and wherein the container has a trap system at the bottom thereof for collecting the sediment and the gelatinous substance so that the wine poured from the container will be clarified and need not be subjected to the existing clarifying procedures requiring great skill and dexterity.

Finally, it is an object of the present invention to provide a sediment trap arrangement which may be conveniently and economically incorporated in containers of different shapes, sizes and materials, such as, gallon jugs, bottles, flasks and wine-glasses intended to hold a single serving.

In accordance with the present invention the above, and other objections, features and advantages appearing hereinafter, are achieved by providing the container with a conical bottom surface sloping downwardly toward the center and a trap chamber in the bottom wall of the container opening into the container through a small opening so that, as the sediment settles out of the liquid contents of the container, the sediment will sift along the conical bottom surface and pass downwardly into the trap chamber through the small opening. When the container is inclined or inverted to pour out the liquid contents, the small opening communicating with the trap chamber is exposed to the atmosphere and atmospheric pressure prevents the discharge of the sediment and the small quantity of liquid contained in the trap chamber so that the poured-off liquid is clarified or free of sediment. It is to be understood that the atmospheric pressure acting on the surface of the liquid contained within the trap chamber functions to hold the liquid within the trap chamber and no artificial pressures within or introduced into the container are required for this purpose. In certain embodiments of the invention, the bottom surface of the trap chamber is also conical but inclined downwardly away from the center which is aligned with the small opening communicating with the main body of the container so that the sediment entering the trap chamber is directed radially outward away from the center to further discourage return of the sediment through the small central opening when the container is inverted for pouring-off the liquid contents. The trap chamber may be formed as an integral part of the bottom of the container, in which case the container is discarded after use, or the bottom of the trap chamber can be removable for cleaning out the collected sediment so that the container can then be refilled and used again. Further, in another embodiment of the invention the bottom of the trap chamber is vertically adjustable for varying the volumetric capacity of the trap chamber so that the capacity of the trap chamber can be adjusted to accommodate the deposited sediment while reducing to a minimum the volume of liquid which is also entrapped. Still another embodiment of the invention, particularly adapted for containing a sediment forming liquid having a gelatinous clarifying substance therein, such as, a sparkling wine, is provided with a supplementary trap chamber in the bottom thereof between the main body of the container and the first mentioned or main trap chamber. The supplementary trap chamber has a flat ceiling and a conical side wall which inclines downwardly toward the center, and communicates downwardly with the main trap chamber through the small opening in the latter. The supplementary trap opens upwardly at the center of the bottom surface of the container through an opening which is larger than the opening between the supplementary trap and the main trap so that the initial or fine sediment passes into and is entrapped in the main trap and the gelatinous clarifying substance, with the sediment collected thereby, is deposited in the supplementary trap.

In order that the present invention may be fully understood, several illustrative embodiments are hereinafter described in detail and shown in the accompanying drawings forming a part hereof and wherein:

Fig. 1 is a side elevational view of a container constructed according to an embodiment of the invention, and which is shown partly broken away and in section;

Fig. 2 is a fragmentary vertical sectional view of the bottom portion of a container constructed in accordance with another embodiment of the invention;

Fig. 3 is a view similar to Fig. 2, but showing another embodiment of the invention;

Fig. 4 is a vertical sectional view of a container in the form of a wine glass, constructed in accordance with another embodiment of the present invention;

Fig. 5 is a view similar to Fig. 2, but illustrating another embodiment of the invention;

Fig. 6 is a view similar to Fig. 5, but showing a modification of the embodiment illustrated therein.

Figure 7:
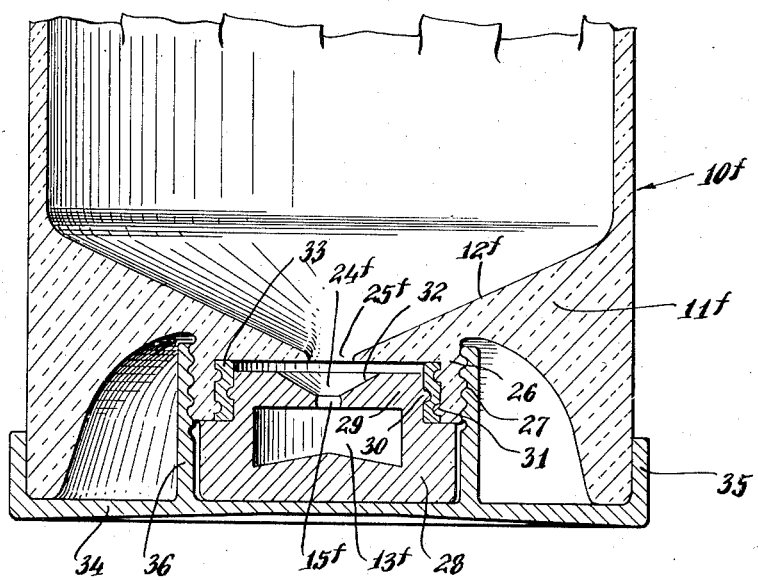
Fig. 7 is a view similar to Fig. 5, but illustrating still another embodiment of the invention.

Referring to the drawings in detail, and initially to Fig. 1, thereof, a container, in the form of a bottle and constructed in accordance with an embodiment of the present invention, is there illustrated and generally identified by the reference numeral 10. The container 10, while shown in the form of a bottle, may have the configuration of a jug, flask or any other suitable shape for containing a liquid, and is constructed of any material normally used for such containers, for example, glass, pottery, plastic resins or metal.

The bottom wall 11 or lowest point of the container 10 is formed with a conical upper surface 12 which inclines downwardly toward the center, and a trap chamber 13 is formed in the bottom wall 11 at a central location and communicates with the interior 14 of the container through a small opening 15 at the center of the conical surface 12. The volume of the chamber 13 is sufficient to accommodate all of the sediment which will be deposited out of the liquid in the container, and the opening 15 has a diameter which is large enough to permit the sediment particles to enter therethrough into the chamber 13 but small enough to prevent the return flow of liquid and sediment out of the trap chamber 13 when the container 10 is inverted for pouring out the liquid contents through the discharge neck 16 at the top of the container. It has been found that a diameter for the opening 15 of about 1/16" to about 1/8" is satisfactory for the above purposes.

Further, the bottom surface 17 of the chamber 13 is preferably conical and inclined downwardly away from the center so that, as the sediment enters the trap chamber through the small central opening 15, the inclination of the trap chamber bottom surface 17 deflects the sediment outwardly away from the center to deter the return of the sediment from the chamber 13 through the opening 15 when the container 10 is inverted for discharging its liquid contents.

The container 10 operates to collect and retain the sediment formed in a liquid, for example, in a wine and the like, in the following manner:

The container is filled with wine in the usual way and sealed by a cork 18. As sediment forms in the wine, it settles toward the bottom of the container which is maintained in an upright position. The settled sediment sifts along the conical bottom surface 12 toward the central opening 15 and falls through the latter into the trap chamber 13 wherein the sediment is deflected outwardly away from the opening by the conical lower surface 17. When the clarified wine is to be consumed, it is necessary only to remove the cork or stopper 18 and to pour out the contents by tilting or inverting the container 10. Inverting the container 10 causes atmospheric pressure to be applied at the small opening 15 for preventing discharge from the trap chamber 13 of the sediment and the small quantity of wine in the trap chamber. Thus, the sediment collected in the trap chamber cannot contaminate the wine during the pouring of the latter and the segregation of the sediment from the liquid constituents of the wine is achieved without requiring any particular skill or dexterity on the part of the person opening the container. Further, since the sediment is automatically collected and segregated from the main body of wine in the container 10, it is apparent that there is no necessity of opening the container during aging to remove the deposited sediment and the additional expense of opening, sediment removal, and rebottling is avoided.

In the embodiment of the invention illustrated in Fig. 1, the sediment trap chamber 13 forms an integral part of the bottom wall 11 of the container 10 and the sediment, once it enters into the chamber 13, cannot be removed so that the container is not reusable. However, a reusable container embodying the present invention can be constructed, as shown in Fig. 2. The reusable container 10a of Fig. 2 includes a bottom wall 11a having a conical top surface 12a inclining downwardly toward the center. An opening 15a, similar to the opening 15 of the embodiment illustrated in Fig. 1, is formed at the center of the conical surface 12a and communicates with the sediment trap chamber 13a. The chamber 13a is defined by a downwardly open recess 19 formed in a central boss 20 depending from the bottom wall 11a, and a cap 21 having a threaded peripheral flange 22 which threadably engages screw threads formed on the outer surface of the boss 20.

The embodiment of the invention illustrated in Fig. 2 operates in the same manner as has been described in connection with Fig. 1 to collect and retain the sediment formed in the liquid contents so that the latter remains clarified when it is poured out of the container. However, when the liquid contents have been completely removed from the container 10a, the cap 21 can be separated from the boss 20 to permit the sediment to be cleaned from the trap chamber 13a so that the container may then be reused.

Since the quantity of liquid entrapped in the trap chamber along with the sediment is lost, it is desirable to provide the trap chamber with the smallest capacity adequate to accommodate all of the sediment deposited by the liquid. However, the amount of sediment deposited will vary among different liquids and also in accordance with the changes in atmospheric conditions to which the liquid may be subjected. Therefore, in the embodiment of the invention illustrated in Fig. 3, the container 10b is provided with a sediment trap chamber 13b of variable or adjustable capacity. Thus, when the liquid, for example, a wine, is first placed in the container, the trap chamber 13b is adjusted to its minimum capacity and this capacity is gradually increased as sediment is deposited so that, at all times, only a relatively small quantity of wine is entrapped in the chamber 13b along with the collected sediment thereby minimizing the amount of the wine which is not usable.

Specifically, the container 10b of Fig. 3 includes a bottom wall 11b having a conical upper surface 12b which inclines downwardly toward a central opening 15b. The opening 15b communicates with a sediment trap chamber 13b which is defined by a recess 19b opening downwardly in a boss 20b depending centrally from the bottom wall 11b. A cap 21b is formed with a threaded peripheral flange 22b which engages suitable screw threads on the outer surface of the boss 20b, and a plunger 23, preferably formed of cork, projects upwardly from the cap 21b and telescopes into the recess 19b. Thus, as the cap 21b is threaded on or off the boss 20b, the plunger 23 moves vertically within the recess 19b to vary the volume or capacity of the sediment trap chamber 13b. It is apparent that the cap 21b may also be removed completely from the boss 20b to permit cleaning-out of the trap chamber 13b and reuse of the container 10b. Further, the top surface 17b of the plunger 23 is preferably conical and inclined downwardly away from the center to cause the sediment entering the trap chamber through the opening 15b to be deflected radially outward away from the center for deterring return of the collected sediment into the main body of the container.

While containers of any shape and size can be formed with sediment trap chambers of the kind herein described, a particular embodiment of the invention, illustrated in Fig. 4 and generally identified by the reference numeral 10c, is in the form of a wine glass having the capacity of a single serving. The wine glass 10c is provided with a suitable closure (not shown) for sealing the open top 16c thereof, and the wine is placed in the glass 10c at the bottling plant and then sealed so that, when the glass is served in a restaurant and the like, the consumer is assured that the contents of the glass are truly identified by the label and the glass is then discarded after use. The wine glass 10c is shaped so that the lower portion of the inner surface inclines downwardly and inwardly, as at 12c, toward a central small opening 15c, and a sediment trap chamber 13c, which is similar to the trap chamber 13 of the embodiment in Fig. 1, is formed in the base 11c of the wine glass and communicates with the small opening 15c. Thus, during the period that the wine sealed in the glass is aging, the sediment formed falls to the bottom of the wine glass and is collected in the trap chamber 13c. When the closure (not shown) is removed from the top of the wine glass and the contents are drained in the usual manner, the sediment remains entrapped in the chamber 13c and is not consumed.

It is the general practice in the production of sparkling wines to include a quantity of gelatinous material, for example, fish gelatin, in the wine when it is bottled to act as a clarifying agent. The wine is then stored with the neck lowermost so that the gelatin collects the sediment which forms during continued fermentation of the wine in the bottle and holds this collected sediment in the area of the bottle neck. Then the bottle is opened and the carbon dioxid blows-out the gelatin and collected sediment, and the bottle is filled again with clarified wine and recorked. This procedure is time consuming and expensive and requires the services of highly skilled personnel in order to ensure that all of the gelatin and sediment is removed from the wine. Further, the necessity of opening the bottles during aging to permit removal of the gelatin and collected sediment results in loss of aroma and life from the wine. However, in accordance with the present invention a trap arrangement provided at the bottom of the bottle, or other container, collects and retains the gelatin and sediment so that clarified wine can be poured from the bottle for consumption and there is no need to follow the above described procedure for removing the gelatin and sediment during aging.

Referring to Fig. 5 of the drawings, a container embodying the present invention and particularly adapted for receiving a sparkling wine containing a gelatinous clarifying substance is there illustrated and generally identified by the reference numeral 10d. The upper surface 12d of the bottom wall 11d of the container 10d is conical and inclines downwardly toward the center, and a main sediment trap chamber 13d is formed in the bottom wall 11d and has a small opening 15d at the top thereof corresponding to the opening 15 of the embodiment shown in Fig. 1. A supplementary trap chamber 24 is formed in the wall 11d above the main trap chamber 13d and has a conical side wall inclining downwardly toward the center at which the small opening 15d is located. The ceiling of the chamber 24 is preferably flat and has an opening 25 therein which is larger than the opening 15d and places the chamber 24 in communication with the main body of the container at the center of the conical surface 12d.

When wine having a gelatinous clarifying material therein is placed in the container 10d, the fine sediment which is deposited first passes downwardly along the conical surface 12d, through the opening 25, supplementary trap chamber 24 and opening 15d into the main trap chamber 13d. The gelatinous clarifying material and the heavier sediment particles collected thereby pass through the opening 25 and into the supplementary trap chamber 24 where the gelatinous material extends across and seals the opening 25. Thus, when the container is inverted to pour-off the clarified wine, the gelatinous material seals the trap chambers to prevent return of the sediment into the main body of the container and the gelatinous material and sediment are retained in the trap chambers 13d and 24 to avoid any contamination of the clarified wine.

The container 10e illustrated in Fig. 6 is generally similar to that described immediately hereinabove and shown in Fig. 5, with the exception that the bottom of the main trap chamber 13e is provided by a cap 21e having a threaded peripheral flange 22e which threadably engages screw threads formed on the outer surface of a boss 20e depending from the bottom wall 11e of the container and having the trap chambers 13e and 24e formed therein. Thus, by removing the cap 21e, the sediment and gelatinous clarifying material can be cleaned out and the container conditioned for use. Further, the provision of the removable cap 21e forming the bottom of the main trap chamber substantially facilitates the formation of the trap chambers in the bottom wall either by casting or molding.

Referring now to Fig. 7, the container 10f therein illustrated is substantially similar to the embodiment of Fig. 5 in that it includes a supplementary trap chamber 24f opening upwardly through an opening 25f at the center of the conical surface 12f at the bottom of the container, and a main trap chamber 13f below the chamber 24f and opening into the latter through the small opening 15f. However, the structure used to define the trap chambers is different and includes an annular depending rim 26 extending from the container bottom wall 11f and having screwthreads 27 on the outer surface thereof. A cylindrical insert 28 is formed with an upper portion 29 of reduced diameter having an annular rib 30 on its outer surface, and a sealing ring 31, of cork or other suitable material, extends around the portion 29 and is gripped by the rib 30 to prevent separation of the sealing ring from the insert.

The insert 28 is formed with the main trap chamber 13f therein and has a conical surface portion 32 at the top which is intended to define the side wall surface of the supplementary trap chamber 24f and inclines downwardly toward the central opening 15f which communicates with the chamber 13f. The reduced diameter portion 29 of the insert, with the sealing ring 31 thereon, fits into the rim 26 and annular ribs 33 on the internal surface of the rim grip the sealing ring to ensure the provision of a right seal between the insert 28 and the main body of the container.

A securing cap 34 is formed with an upstanding marginal flange 35 adapted to telescope over the lower portion of the outer surface of the container, and a collar 36 also extends upwardly from the cap 34 and is internally threaded to engage the threads 27 on the external surface of the rim 26. Thus, in assembling the parts, the insert 28 fits into the pocket defined by the collar 36 and, as the latter is threaded onto the rim 26, the cap 34 bears against the insert and urges the latter into its sealed position, as shown in Fig. 7.

The structural arrangement shown in Fig. 7 has the advantage of simplifying the separate construction of the several parts which are then easily assembled together, and also of making it possible to discard and replace the insert 28 to permit reuse of the container.

Figure 8:
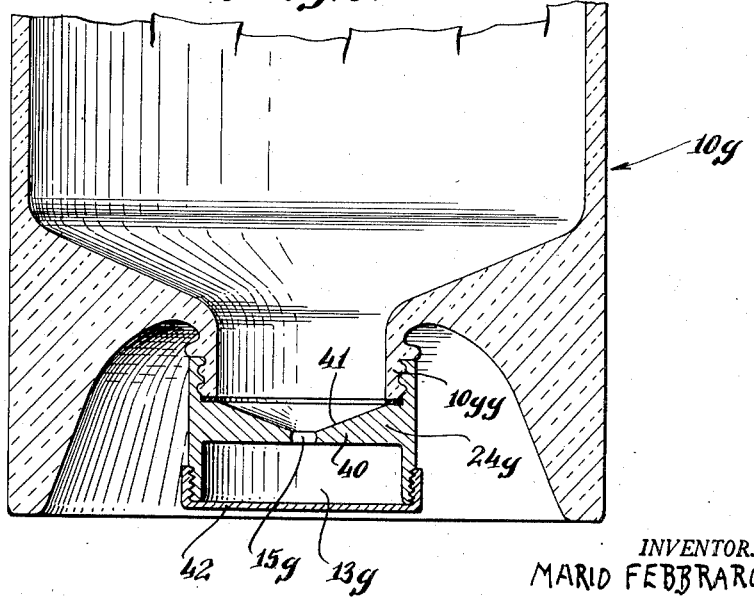
Fig. 8 is a view similar to Fig. 2, but showing another embodiment of the invention.

In the showing of Fig. 8, the container 10g has a supplementary trap member 24g having an open top removably threadedly engaged with a tubular downward extension 10gg on the bottom of the container 10g.

The trap member 24g has an intermediate wall 40 provided at its center with the small opening 15g. The intermediate wall 40 contacts the bottom edges of the extension 10gg and has a conical surface portion 41 which slopes down to the small opening 15g to facilitate the movement of the sediment through the small opening 15g into the main trap chamber 13g of the trap member 24g. The bottom of the trap member 24g is closed by a removable cap 42 which is threaded to the bottom of the trap member 24g.

The construction of Fig. 8 permits removal of the cap 42 to clean the interior of the main trap chamber 13g of the trap member 24g. In addition, if desired, the trap member 24g can be completely removed from the extension 10gg to facilitate cleaning of the interior of the container 10g. It is thus apparent that the construction of Fig. 8 provides a container which can be easily cleaned and kept in a sanitary condition for reuse, when desired.

All sealing corks and/or gaskets have been omitted from the drawings for simplification of the illustrations. It is understood, however, that such cork and/or gaskets can be added, where required, without effecting the scope of the invention.

While I have described several illustrative embodiments of my invention, it is to be understood that the invention is not limited to these precise embodiments and that various changes and modifications can be effected therein without departing from the scope and spirit of the invention as defined in the appended claims.

What I claim is:

1. A container for a liquid having sediment particles which settle therein; said container having a discharge opening adjacent the top thereof and a bottom wall formed with a substantially conical surface inclined downwardly toward the center thereof, and means at the bottom of said container defining a sediment trap chamber having a small opening at the top thereof placing said trap chamber in communication with the interior of the container at the center of said conical bottom surface so that sediment particles settling in a liquid in the container sift along said conical surface and enter said trap chamber through said small opening in the top of the latter and the sediment particles are retained in said trap chamber when the container is inverted by atmospheric pressure acting at said small opening, said means at the bottom of the container further defines a supplementary trap chamber above the first mentioned trap chamber and communicating with the latter through said small opening, said bottom wall of the container having a relatively large opening at the center of said substantially conical surface opening into said supplementary trap chamber so that a clarifying gelatin in a liquid in said container is collected in said supplementary trap chamber along with relatively large sediment particles and seals-off said first trap chamber containing fine sediment particles.

2. A container according to claim 1; wherein said supplementary trap chamber is formed with a conical surface inclined downwardly toward the center to said small opening so that fine sediment particles entering said supplementary trap chamber are directed toward the center for passage through said small opening into said first trap chamber.

3. A container according to claim 2; wherein said first trap chamber is formed with a conical surface aligned axially with said small opening and inclined downwardly away from the center so that fine sediment particles entering said first trap chamber through said small opening are directed outwardly away from the center by contact with said bottom surface of the first trap chamber to discourage return of the particles through said small opening.

4. A container according to claim 2; wherein said means defining the trap chambers includes a removable cap member forming the bottom surface of the first trap chamber so that said cap member can be removed to open said first trap chamber downwardly to permit said trap chambers to be cleaned out for readying said container for reuse.

5. A container according to claim 1; wherein said means at the bottom of the container and defining the trap chambers includes an annular rim depending from said bottom wall concentric with said relatively large opening in the latter, an insert member having said first trap chamber in the interior thereof and a depression in the top surface of said insert member with said small opening communicating said depression with said first trap chamber, the upper portion of said insert member being of reduced diameter, sealing means on said upper portion of the insert member and adapted to fit into said annular rim so that said depression defines said supplementary trap chamber communicating with said relatively large opening, and removable means holding said insert member with said upper portion of the latter within said annular rim.

6. A container according to claim 5; wherein said sealing means includes a sealing ring of packing material fitting between the outer surface of said reduced diameter upper portion and the inner surface of said annular rim, and annular gripping ribs extending from said outer surface and inner surface of the upper portion and annular rim, respectively, and gripping said sealing ring to provide a tight seal.

7. A container according to claim 5; wherein said removable means holding the insert member includes a cap member extending across the bottom of the container and having upstanding inner and outer flanges thereon, said inner flange being formed to receive the lower portion of said insert member and to telescope over said annular rim, mating screw threads on the internal and external surfaces of said inner flange and said rim, respectively, and said outer flange being formed to telescope over the lower portion of the container.

References Cited in the file of this patent

UNITED STATES PATENTS

| 55,341 | Morse | June 5, 1866 |
| 603,110 | Marshall | Apr. 26, 1898 |
| 775,040 | King | Nov. 15, 1904 |
| 1,744,947 | Bowman | Jan. 28, 1930 |
| 1,758,219 | Clarke et al. | May 13, 1930 |
| 1,770,480 | Danciger | July 15, 1930 |
| 1,796,478 | Rose et al. | Mar. 17, 1931 |
| 1,892,884 | Grauman et al. | Jan. 3, 1933 |
| 2,036,407 | Godfrey | Apr. 7, 1936 |
| 2,204,784 | Abrams | June 18, 1940 |
| 2,435,612 | Snyder | Feb. 10, 1948 |
| 2,580,836 | Rausch | Jan. 1, 1952 |

FOREIGN PATENTS

| 576,077 | France | May 5, 1924 |